US010288140B2

(12) United States Patent
Xu et al.

(10) Patent No.: US 10,288,140 B2
(45) Date of Patent: May 14, 2019

(54) VARIABLE DAMPING SHOCK ABSORBER (71) Applicant: QINGDAO HAIER WASHING MACHINE CO., LTD., Qingdao, Shandong (CN)

(72) Inventors: Sheng Xu, Shandong (CN); Yanfen Lv, Shandong (CN); Liang Xu, Shandong (CN); Xiuwen Peng, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/544,373

(22) PCT Filed: Jul. 3, 2015

(86) PCT No.: PCT/CN2015/083305
§ 371 (c)(1),
(2) Date: Jul. 18, 2017

(87) PCT Pub. No.: WO2016/115837
PCT Pub. Date: Jul. 28, 2016

(65) Prior Publication Data
US 2017/0370437 A1 Dec. 28, 2017

(30) Foreign Application Priority Data

Jan. 23, 2015 (CN) .......................... 2015 1 0034294

(51) Int. Cl.
*F16F 7/09* (2006.01)
*D06F 37/22* (2006.01)
*D06F 37/20* (2006.01)

(52) U.S. Cl.
CPC ................ *F16F 7/09* (2013.01); *D06F 37/20* (2013.01); *D06F 37/22* (2013.01); *F16F 2222/04* (2013.01); *F16F 2228/066* (2013.01)

(58) Field of Classification Search
CPC ...... F16F 7/09; F16F 2228/066; F16F 222/04; F16F 2222/04; D06F 37/22
(Continued)

(56) References Cited

U.S. PATENT DOCUMENTS 3,598,205 A * 8/1971 Kenyon .................... F16F 9/49
188/174
4,729,458 A * 3/1988 Bauer ..................... D06F 37/20
188/129
(Continued)

FOREIGN PATENT DOCUMENTS

CN 2115425 U 9/1992
CN 1091228 C 9/2002
(Continued)

OTHER PUBLICATIONS

The extended European Search Report dated Nov. 27, 2017, by the European Patent Office in corresponding European Application No. 15878509.7. (7 pages).
(Continued)

*Primary Examiner* — Thomas J Williams
*Assistant Examiner* — Mariano Sy
(74) *Attorney, Agent, or Firm* — Buchanan Ingersoll & Rooney PC (57) ABSTRACT

A variable damping shock absorber has a sleeve and a piston rod, one end of the sleeve being an opening and the other end being closed, one end of the piston rod being inserted through the opening and slidable in an axial direction inside the sleeve. Two sets of friction plates are arranged in the axial direction between an inner wall of the sleeve and an outer wall of the piston rod. A friction plate is fixed in the axial direction with the inner wall of the sleeve, and a sliding friction force between each friction plate set and the outer wall of the piston rod gradually decreases from the closed
(Continued)

end to the opening end of the sleeve. The structure can ensure that the damping force is variable under different load and rotational speed conditions.

10 Claims, 10 Drawing Sheets

(58) Field of Classification Search
USPC ........ 188/381, 129; 267/201–203, 130, 196; 68/23.1, 24, 58, 140
See application file for complete search history.

(56) References Cited

U.S. PATENT DOCUMENTS

| | | | | |
|---|---|---|---|---|
| 5,295,564 | A * | 3/1994 | Stadelmann | F16F 7/09 188/129 |
| 6,264,014 | B1 * | 7/2001 | Ferlicca | D06F 37/20 188/129 |
| 6,367,601 | B1 * | 4/2002 | Ferlicca | F16F 7/09 188/381 |
| 6,955,248 | B2 * | 10/2005 | Park | D06F 37/20 188/129 |
| 7,204,104 | B2 * | 4/2007 | Kim | D06F 37/20 188/284 |
| 7,281,614 | B2 * | 10/2007 | Park | D06F 37/20 188/266 |
| 7,428,954 | B2 * | 9/2008 | Park | F16F 7/09 188/322.17 |
| 7,445,098 | B2 * | 11/2008 | Peuker | D06F 37/20 188/381 |
| 2004/0226321 | A1 | 11/2004 | Park et al. | |
| 2004/0261469 | A1 * | 12/2004 | Park | D06F 37/22 68/23 R |

FOREIGN PATENT DOCUMENTS

| | | |
|---|---|---|
| CN | 1621599 A | 6/2005 |
| CN | 1312347 C | 4/2007 |
| CN | 101037840 A | 9/2007 |
| DE | 955749 C | 1/1957 |
| DE | 3616373 A1 | 11/1987 |
| EP | 1477604 A2 | 11/2004 |

OTHER PUBLICATIONS

International Search Report (PCT/ISA/210) dated Sep. 11, 2015, by the State Intellectual Property Office of the P.R. China as the International Searching Authority for International Application No. PCT/CN2015/083305.
Written Opinion (PCT/ISA/237) dated Sep. 11, 2015, by the State Intellectual Property Office of the P.R. China as the International Searching Authority for International Application No. PCT/CN2015/083305.

* cited by examiner

Fig. 1

Prior Art

Fig. 2

Prior Art

VARIABLE DAMPING SHOCK ABSORBER

FIELD OF THE INVENTION

The present disclosure relates to a field of washing machine, more particularly, to a variable damping shock absorber.

BACKGROUND OF THE INVENTION

Figure 1:
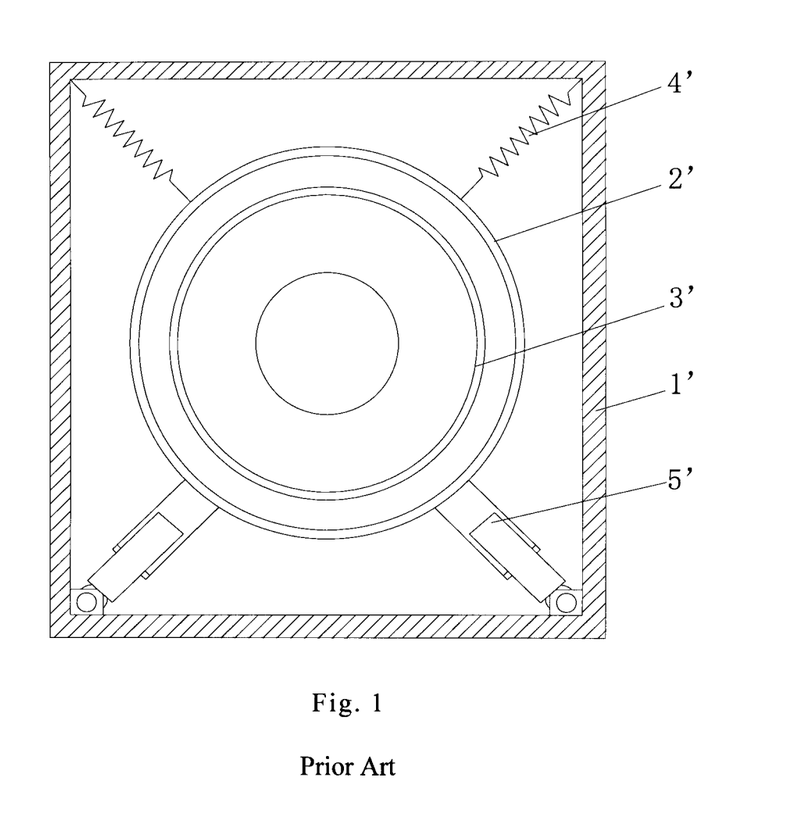
FIG. 1 is a front sectional view of a prior art washing machine.

As shown in FIG. 1, the existing drum washing machine comprises a shell 1' which forms an exterior appearance, as washing bucket 2' for containing washing water is provided in the shell 1', a drum 3' for washing and dewatering the laundry is rotatablly provided in the washing bucket 2', a drive motor connected to a rotatable shaft of the drum is provided behind the washing bucket. A door for throwing in or taking out laundry is arranged at a front surface of the shell, and a stand for supporting the rotatable shaft of the drum is arranged behind the washing bucket. An upper portion of the washing bucket 2' is suspended inside the shell 1' by a spring 4', and a shock absorber 5' for absorbing a vibration transmitted from the drum 3' to the washing bucket 2' is arranged below the washing bucket 2'.

It is known to persons skilled in the art that the shock absorber of the drum type washing machine is limited to effectively absorb in small vibration absorbing and large vibration, because the vibration amplitudes produced in different operating stages of washing such like washing process, rinsing process, low-speed dewatering distribution process are different. In the existing drum type washing machine shock absorber, the damping force of the damping is substantially constant at all times, and the change and adjustment of the damping cannot be achieved.

Figure 2:
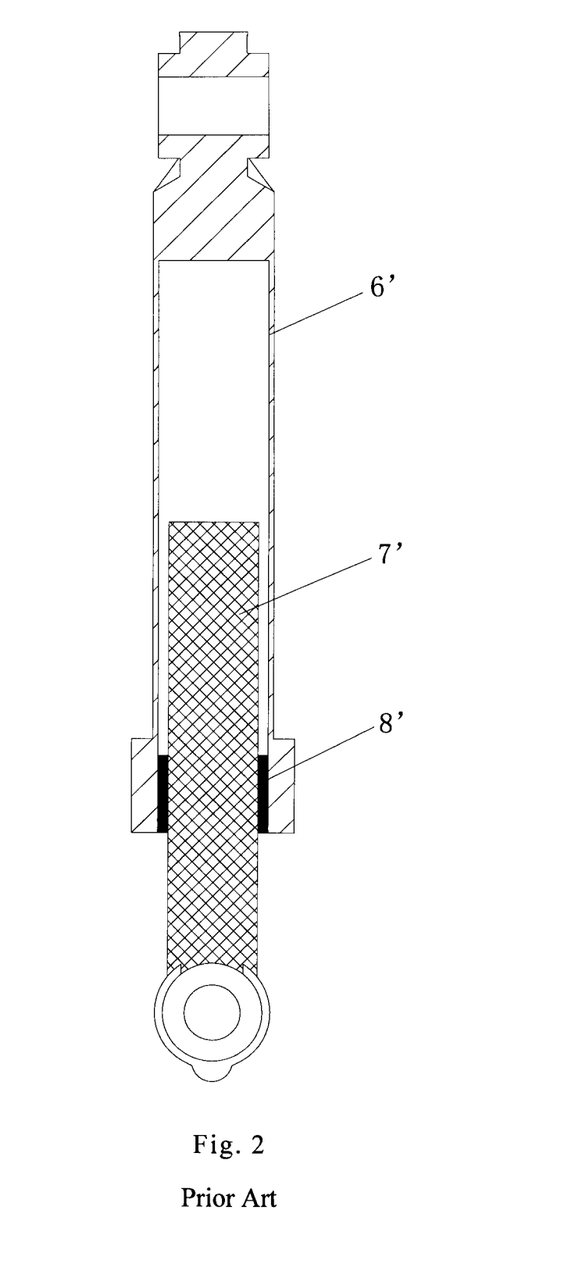
FIG. 2 is a longitudinal sectional view of a prior art shock absorber.

The current widely used shock absorber for the drum washing machine is a friction shock absorber, as shown in FIG. 2. The shock absorber 5' includes a sleeve 6', a piston rod 7' and a friction plate 8'. An end of the sleeve 6' is connected with the washing, bucket 2', an opening is provided on the other end of the sleeve 6'. An end of the piston rod 7' sticks into the sleeve 6' through the opening, the other end of the piston rod 7' is connected to the lower portion of the shell 1' of the washing machine (see FIG. 1), the friction plate 8' abuts against an inner wall of the sleeve 6' and comes into contact with an outer wall of the piston rod 7'.

When the washing machine is working, the movement of the washing bucket 2' drives the sleeve 6' to move, so the friction plate 8' fixed to the inner wall of the sleeve 6' and the piston rod 7' having one end fixed to the shell 1' of the washing machine move relatively. Due to the friction principle, the piston rod 7' produces a damping force on the sleeve 6', which is determined by the friction coefficient of the friction plate 8' and the piston rod 7', and the pressure between the two, and the direction of the damping force is opposite to the direction of the relative movement. The damping force can suppress the excessive vibration of the washing bucket, but due to the principle of force interaction, the sleeve 6' also produces a reaction force of equal magnitude and opposite direction to the piston rod 7', which acts on the lower portion of the washing machine shell 1' to cause the shell 1' to generate a corresponding vibration.

However, the entire working range of the drum washing machine includes both large amplitude conditions such as washing, rinsing, low-speed dewatering, and small amplitude conditions such as high-speed dewatering. The amplitudes are different even in the various stages of large amplitude conditions such as washing, rinsing, low-speed dewatering. In order to suppress the vibrations in the large amplitude conditions, shock absorber with larger damping force is selected. However, the larger damping force is easy to cause a larger vibration of the shell 1' of the washing machine in the small amplitude conditions (such as high-speed dewatering), thus it increases the noise of the whole washing machine. And if a shock absorber with smaller damping force is used, the vibration in the large amplitude conditions cannot be suppressed and there is a possibility of machine shift.

A Chinese applicant No. 92204732.4 patent discloses a shock absorber that utilizes magnetic fluid to adjust the damping. The use of magnetic fluid sealing gas principle by the gas as the working medium and the magnetic fluid as a shock absorber damping regulator, and an electromagnet is installed on the shock absorber, the magnetic field generated by the electromagnet acts on the regulator-magnetic fluid. By adjusting the electromagnet current, the magnetic field strength is changed, so that the regulator has different pressure capacity, to achieve the goal of adjusting the damping. To use the shock absorber, it is connected to the vibrating object, when the object is vibrating, the piston produces movement, the increase and decrease of volumes of the upper and lower cavities that are separated by the piston are relatively opposite to each other. And the air pressure decreases in one cavity and increases in the other one, which results in a pressure difference. The magnitude of the pressure difference is related to a clearance between the piston and a cylinder adjusted by the magnetic fluid, and the pressure difference is small when the clearance is big, the pressure difference is big when the clearance is small. The size of the clearance is regulated by the magnetic fluid which is affected under the magnetic field, and the strength of the magnetic field is controlled by the magnitude of the coil current, thus to achieve the purpose of adjusting the pressure difference, that is damping adjustment.

Although the patent mentioned above discloses a technical scheme of utilizing the change of current to change the sealing of the magnetic fluid to the gas, and thus through pressure difference to adjust the damping. But it did not provide the technical scheme of controlling the change of the current, the person having ordinary skill in the art cannot determine how to adjust the current change in real time to adjust the magnitude of the damping force according to the description of the application file. Additionally, the sealing is not reliable using air as the medium of the shock absorber which is costly as well. The electromagnet is fixed to one end of the shock absorber and the sealing of the magnetic fluid is reduced when the piston moves to the far end of the magnet, and the sealing is increased when the piston moves to the near end of the magnet. The damping force of the air through the magnetic fluid is different and the damping tierce cannot be kept constant. And the piston is a moving part, how the magnetic fluid sticks between the piston and the cylinder wall is not stated in the patent. Secondly, the shock absorbing stroke of the shock absorber can only be designed very short, otherwise the magnetic force generated by the magnet may not be applied to the magnetic fluid, which cannot achieve the sealing effect. Besides, the damping force of this shock absorber cannot be too large, because the air is more easily compressed media. Even if the magnetic flow completely sealed air, and the vibration force is large enough, the piston may also be compressed air into liquid.

On the basis of the above patent, the applicant, in the applicant No. 200710065595.9 application, discloses a drum washing machine having a magnetorheological active shock absorber which installs a plurality of magnetorheological active shock absorbers under the washing bucket. The magnetorheological active shock absorber is connected with an electronic control unit and the electronic control unit is connected with a sensor unit to form a close-loop control circuit. Through the sensor to collect the vibration of the washing machine, it can adjust the damping force real-time, and to achieve the purpose of eliminating or reducing the vibration of the washing machine by timely adjusting the damping force of the shock absorber according to the drum washing machine vibration. Although the application has given a specific technical solution tor controlling the current change, it still does not solve the above-mentioned problems of such shock absorbers in the prior art. In addition, the improved magnetorheological active shock absorber has the following disadvantages:

1. An amplitude capturing component, that is the sensor, is added in the control system of the washing machine, and the damping, of the shock absorber is changing in the whole process, which greatly increases the burden on the control system and manufacturing costs, and it is completely unnecessary. In addition, this is an ideal design, which barely can be controlled and achieved;

2. In the magnetic fluid shock absorber described above, the electromagnet is fixed at one end of the shock absorber and cannot effectively control the flowability of the magnetic fluid in the moving position, so that the damping force cannot be accurately controlled;

3. As long as the speed is higher than the resonant frequency of the speed when the washing machine is in operation, with the increase in speed vibration amplitude will be smaller and smaller, and the damping force can be completely eliminated to avoid the vibration of the energy delivered to the shell, so real-time capturing the amplitude and controlling the damping of the shock absorber is also not necessary.

In the view of foregoing, the present disclosure is proposed.

SUMMARY OF THE INVENTION

A technical problem need to be solved by the present disclosure is to overcome the shortcomings of the existing technology, and to provide a variable damping shock absorber. The shock absorber changes the damping force according to different amplitude conditions during different stages of washing processes of the washing machine to effectively inhibit the vibration generated by the washing machine, thereby improving the vibration of the washing machine and the noise level of the whole machine.

In order to solve the technical problem above, the basic scheme adopted by the present disclosure is: a variable damping shock absorber, comprising a sleeve and a piston rod, one end of the sleeve is an opening and the other end is closed. One end of the piston rod is inserted into through the opening and is slideably provided in an axial direction inside the sleeve. At least two sets of friction plates are arranged in an axial direction between an inner wall of the sleeve and an outer wall of the piston rod, the friction plate is fixed in the axial direction with the inner wall of the sleeve, and a sliding friction force between each friction plate set and the outer wall of the piston rod is different.

Further, the sliding friction force between the friction plates and the outer wall of the piston rod is gradually reduced from a closed end to an open end of the sleeve.

Further, each set of the friction plates has a same thickness in a radial direction of the sleeve and has different friction coefficients of surfaces of one side which is in contact with the outer wall of the piston rod, and the friction coefficient decreases from the closed end to the open end of the sleeve.

Further, each set of friction plates are of a same material, and the thicknesses of the friction plates in the radial direction of the sleeve are different, and the thicknesses of each set of friction plates decrease from the closed end to the open end of the sleeve.

Further the friction plate is a cylindrical structure, and a chamfered guide structure for facilitating an insertion of the piston rod is provided at an end corresponding to the opening of the sleeve.

Further, a head of the end inserted into the sleeve of the piston rod is provided with a truncated cone shaped guide structure which is easily passed through the friction plates.

Further, the friction plate comprises a first friction plate provided on an inner wall of the open end of the sleeve.

In this scheme, a friction plate having a different thickness or a different coefficient of friction is provided at other positions of the sleeve at the same time as at the opening end the inner wall of the sleeve is provided with the friction plate, and the sliding friction force between the piston rod and the friction plate from the opening end of the sleeve to the closed end of the sleeve is gradually increased. During the washing, the piston is longer inside the sleeve. The friction plate which is thicker or has the larger friction coefficient is in contact with the piston rod, the pressure between the friction plate and the piston rod is larger and the damping force is larger. With the progress of the dewatering process, the amount of water is discharged more, the washing bucket assembly continually moves up, friction plate inside and the piston rod are no longer contacting, the sliding friction force of the friction plate contacts with the piston rod externally gradually reduces, and the damping force gradually reduces.

Another scheme provided by the present disclosure is: a variable damping shock absorber comprising a sleeve and a piston rod, one end of the sleeve is an opening, the other end is closed. One end of the piston rod is inserted into through the opening and is slideably provided in an axial direction inside the sleeve. One set of friction plates is arranged between an inner wall of the sleeve and an outer wall of the piston rod. The friction plate is fixed in the axial direction with the inner wall of the sleeve, and is in contact with the outer wall of the piston rod and relatively slides to each other. When the piston rod is slid, a friction three between the piston rod and the friction plate along the axial direction of the piston rod is gradually reduced.

Further, the friction coefficient of the outer surface of the piston rod is gradually increased from one end inserted into the sleeve to the other end.

Further, a diameter of the piston rod is gradually increased from one end inserted into the sleeve to the other end, and the piston rod is a truncated cone shaped structure.

The scheme described above is to change the friction coefficient of the surface of the piston rod or change the shape of its structure, and the position of the friction plate is the same which is installed at the opening end of the sleeve as the prior art. During the washing, the length of the piston rod is longer inside the sleeve. Part of the piston rod which is larger diameter size or has the larger friction coefficient of the surface is in contact with the friction plate at the opening end of the sleeve, the pressure between the friction plate and the piston rod is larger and the damping force is larger. During the dewatering process, as the amount of water in the washing bucket decrease, the washing bucket assembly continually moves up, a length of the part of the piston rod which is inside the sleeve is getting shorter. Part of the piston rod which is smaller diameter size or has the smaller friction coefficient of the surface is in contact with the friction plate at the opening end of the sleeve. The pressure between the friction plate and the piston rod is smaller and the damping three is smaller. The scheme ensures that the damping force is variable regardless of the load and speed conditions.

Alternatively, by changing the shape of the friction plate, the principle is the same as the structural shape of the piston rod. Specifically, the piston rod is a cylindrical structure, the friction plate is a cylindrical structure affixed to the inner wall of the sleeve, and a thickness of the friction plate is gradually reduced from the closed end to the opening end of the sleeve. During the washing, a length of the piston rod in the sleeve is larger, the piston rod squeezed by the thicker part of the friction plate and the damping force is larger. During the dewatering process, as the amount of water in the washing bucket decreased, the washing bucket assembly continually moves up, and the piston rod slides outwardly. The piston rod moves out of the squeezing of the thicker part of the friction plate and gradually contacts with the thinner part of the friction plate, the pressure between the friction plate and the piston rod is smaller and the damping force is smaller.

By adopting the above-mentioned scheme, the present disclosure has the following beneficial effects as compared with the prior art.

The closed end of the sleeve of the shock absorber of the present disclosure is connected to the washing bucket, and the other end is an opening. One end of the piston rod is slideably provided in the sleeve through the opening, the other end is hinge mounted on a base of the washing machine. During the washing process, with large amount of water in the washing bucket, the whole weight is larger and the part of the piston rod inside the sleeve is larger as the sleeve moves downwards. During the dewatering process, the drainage process of the washing machine is completed and the whole weight of the washing bucket gradually reduces as the spinning speed increases, the part of the piston rod sticks outside of the sleeve is larger as the sleeve moves upwards. The vibration amplitude in the washing process is larger and a larger damping three is required, the vibration amplitude in the dewatering process is smaller and a smaller damping force is required.

The shock absorber of the present disclosure adjusts the damping force according to different sizes of the parts of the piston rod inside of the sleeve, that is, the friction forces between the piston rod and the friction plate corresponding to different depth of the sleeve are different. Piston rods with different radius sizes are used in different washing processes which provide different magnitudes of damping forces for the washing machine in different stages such as washing, rinsing and dewatering to achieve the purpose of shock absorbing.

The shock absorber of the present disclosure is simple and practical, and the cost is low, and the structure can ensure that the damping force is variable under different load and the rotational speed conditions.

DETAILED DESCRIPTION OF THE INVENTION

Embodiments of the present disclosure will now be described in further detail with reference to the accompanying drawings.

Embodiment 1

Figure 3:
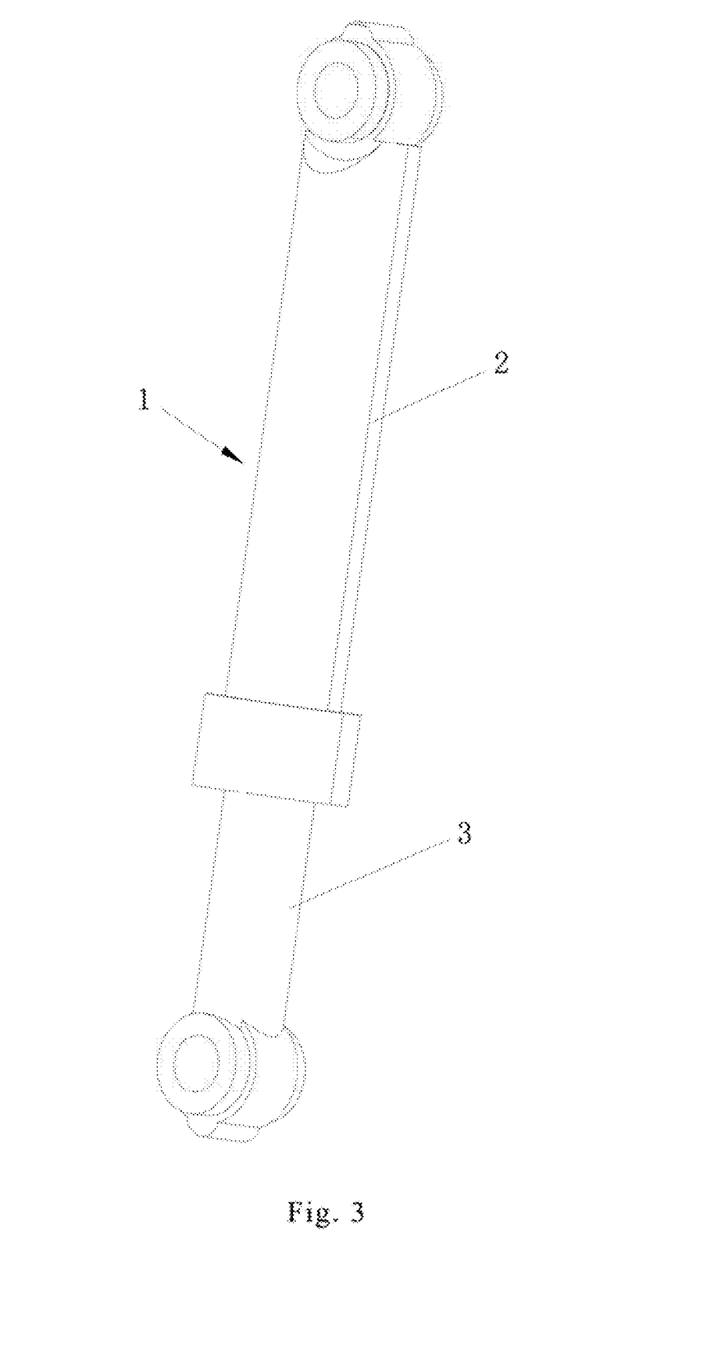
FIG. 3 is a schema is diagram of a shock absorber of the present disclosure.
Figure 4:
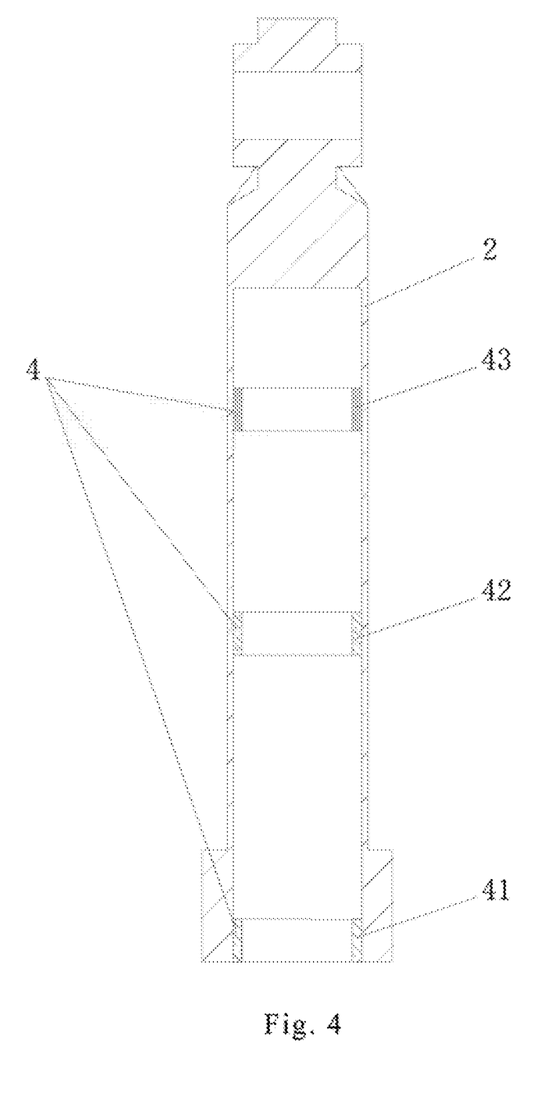
FIG. 4 and FIG. 5 are longitudinal sectional views of different structures of the sleeve of the shock absorber of the present disclosure, respectively.
Figure 5:
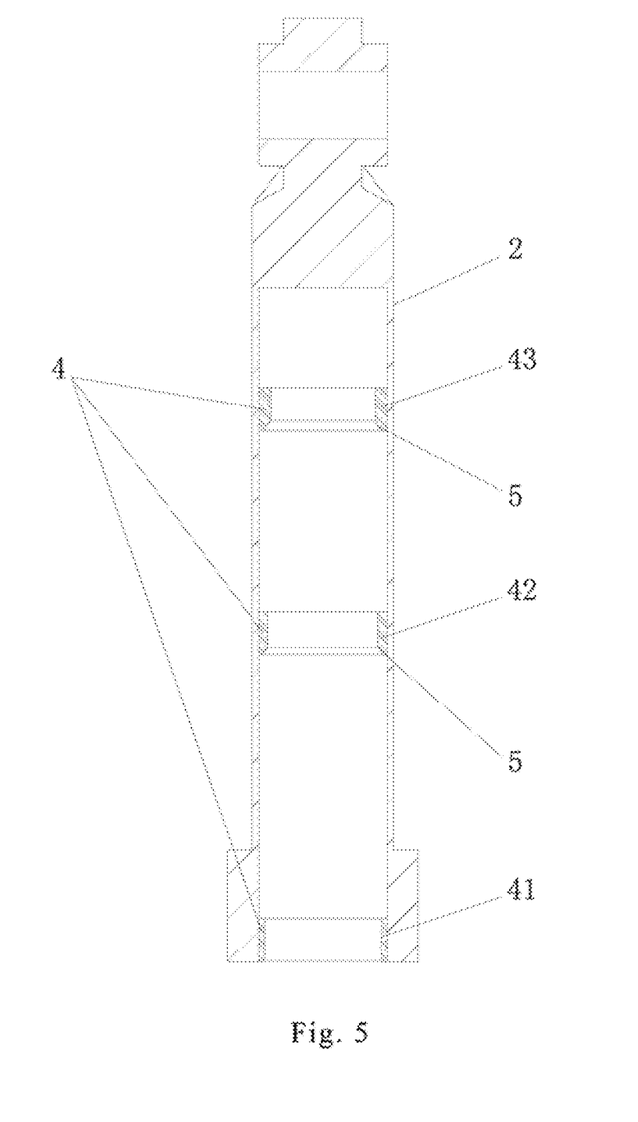

As shown in from FIG. 3 to FIG. 5, a variable damping shock absorber 1 of the present disclosure comprises a sleeve 2 and a piston rod 3, one end of the sleeve 2 is an opening and the other end is closed. One end of the piston rod 3 is inserted into through the opening and is slideable in an axial direction inside the sleeve 2. At least two sets of friction plates 4 are arranged in an axial direction of the sleeve 2 between an inner wall and an outer wall of the piston rod 3, the friction plates 4 is fixed in the axial direction of the sleeve 2 with the inner wall of the sleeve 2, and the sliding friction force between each set of the friction plates 4 and the outer wall of the piston rod 3 is gradually reduced from a closed end to an open end of the sleeve 2.

Embodiment 2

As shown in FIG. 4, the sleeve 2 of the present embodiment is provided with three sets of friction plates 4 which are respectively a first friction plate 41 provided at an inner wall of the opening end of the sleeve, a second friction plate 42 provided at a middle part of the sleeve and a third friction plate 43 provided near the closed end of the sleeve. The three sets of friction plates 41, 42, 43 have the same thickness in the radial direction of the sleeve 2 and have different friction coefficients of the surfaces in contact with the outer wall of the piston rod 3, and the friction coefficients decrease from the closed end to the opening end of the sleeve 2. That is, the friction coefficients of the surfaces of the third friction plate 43, the second friction plate 42, and the first friction plate 41 in contact with the outer wall of the piston rod 3 get smaller in turn. The friction plates are arranged like this so that the sliding friction force between the piston rod and the friction plate gradually increases from the opening end to the closed end of the sleeve.

Since the length of the piston rod 3 in the sleeve 2 is larger during washing, the third friction plate 43 having a larger friction coefficient comes into contact with the piston rod 3, and the pressure between the third friction plate 43 and the piston rod 3 is larger, so the damping force is larger. When the drainage process is completed, the water in the washing bucket is drained away and the washing bucket assembly continually moves up. The third friction rod 43 is no longer in contact with the piston rod 3, the sliding friction force between the second friction plate 42 and the piston rod 3 is the damping force of the shock absorber at this time. As the progress of the dewatering, the water contained in the laundry in the washing bucket gradually decrease and the second friction plate 42 is no longer in contact with the piston rod 3, only the first friction plate 41 at the opening end of the sleeve is in contact with the piston rod, and the pressure between the friction plate and the piston rod is smaller and the damping force reduces. Of course, due to the impact of factors such as amount of clothing, clothing water absorption, clothing eccentric distribution and rotation speed, in the low-speed dewatering process, the stroke of the piston rod in the sleeve changes greatly. Therefore, there is also possible that the sliding friction force between the third friction plate 43 and the piston rod 3, the sliding friction force between the second friction plate 42 and the piston rod 3, the sliding friction force between the first friction plate 41 and the piston rod 3 act respectively as the damping force, that is the damping force changing frequently.

Embodiment 3

As shown in FIG. 5, the different between the present embodiment and the embodiment 2 is: the three sets of friction plates 41, 42, 43 are of a same material, and the thicknesses of the friction plates in the radial direction of the sleeve 2 are different, and the thicknesses of three sets of friction plates decrease from the closed end to the open end of the sleeve 2. That is, the thicknesses of the third friction plate 43, the second friction plate 42 and the first friction plate 41 in the radial direction of the sleeve 2 decrease in turn. The arrangement of the friction plates can also cause the sliding friction force between the piston rod and the friction plate to gradually increase from the opening end to the closed end of the sleeve.

Embodiment 4

Figure 6:
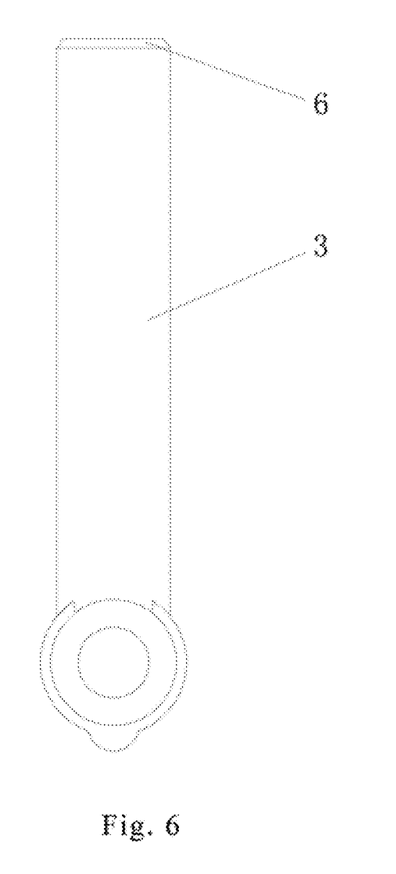
FIG. 6 is a schematic diagram of a structure of the piston rod of the shock absorber of the present disclosure.

As shown in FIG. 5, the present embodiment is a further improvement on the basis of the embodiment 3. Because several sets of friction plates are provided and when every time the piston rod needs to pass the friction plate 4, such as the second friction plate 42 and the third friction plate 43, a chamfered guide structure 5 for facilitating an insertion of the piston rod 3 is provided at an end corresponding to the opening of the sleeve 2 in order to prevent the piston rod from properly inserting. The inner diameter of the friction plate 4 is expanded from the inside to the outside to guide the insertion of the piston rod 3. Alternately, a head of the end inserted into the sleeve 2 of the piston rod 3 is provided with a truncated cone shaped guide structure 6 which is easily passed through the friction plate 4 (see FIG. 6). The above two structures can be used alone or in combination.

Embodiment 5

Figure 7:
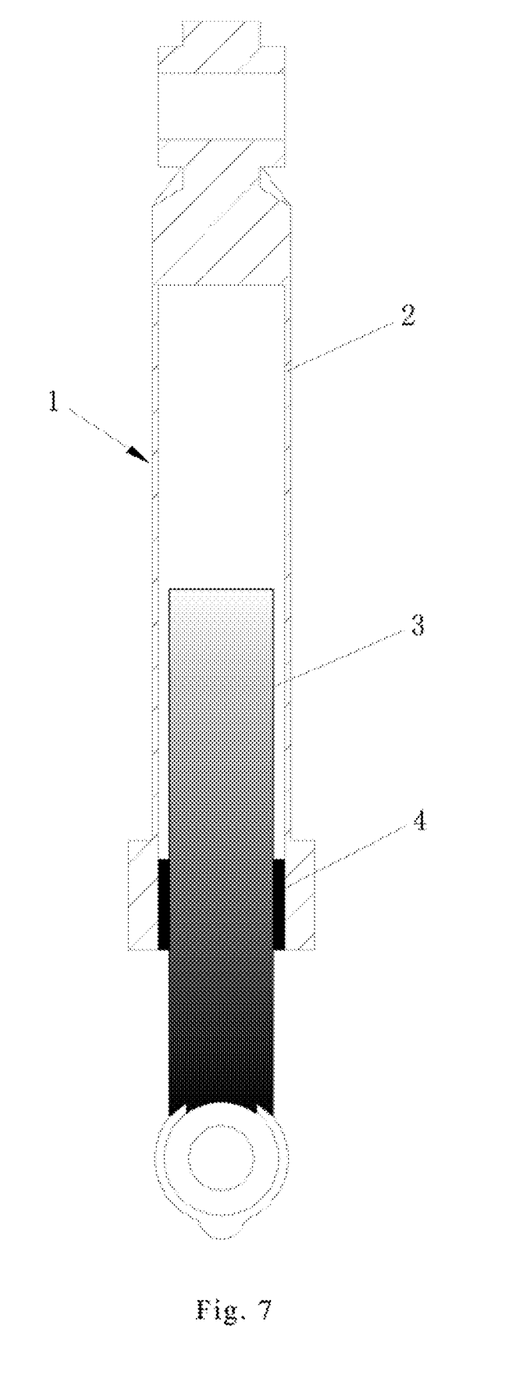
FIG. 7, FIG. 8 and FIG. 9 are longitudinal sectional views of different structures of the shock absorber of the present disclosure.
Figure 8:
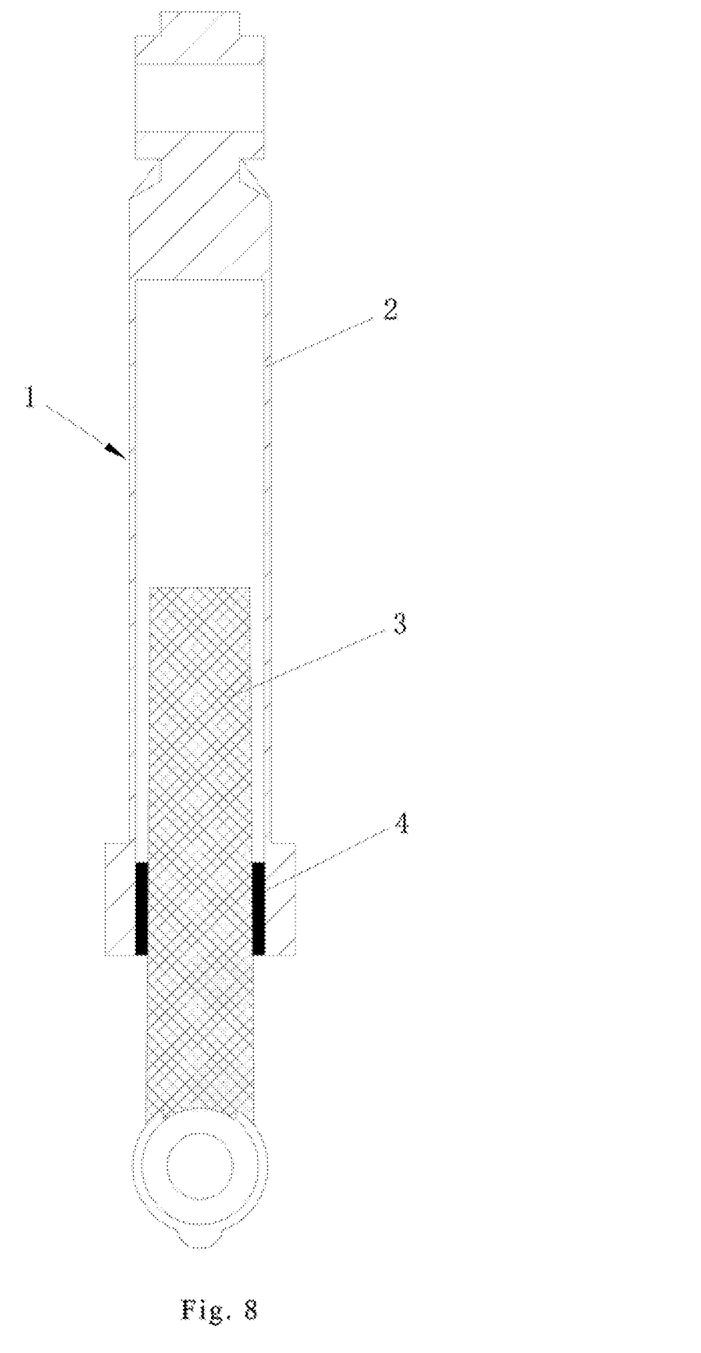
Figure 9:
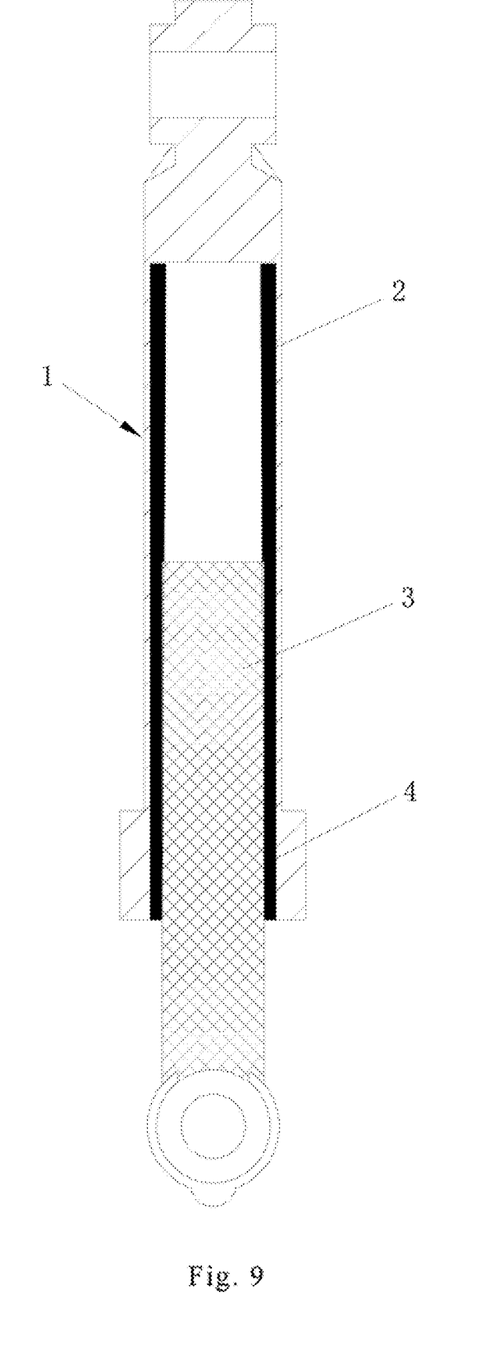

As shown in from FIG. 7 to FIG. 9, the variable damping shock absorber 1 of the present disclosure comprising a sleeve 2 and a piston rod 3, one end of the sleeve 2 is an opening, the other end is closed. One end of the piston rod 3 is inserted into through the opening and is slideable in an axial direction inside the sleeve 2. One set of friction plates 4 is arranged at the opening end between an inner wall of the sleeve 2 and an outer wall of the piston rod 3. The friction plates 4 is fixed in the axial direction with the inner wall of the sleeve 2, and contacts with the outer wall of the piston rod 3 and relatively slides to each other. When the piston rod 3 is slid, a friction force between the piston rod 3 and the friction plate 4 along the axial direction of the piston rod is gradually reduced.

Embodiment 6

As shown in FIG. 7, the friction coefficient of the outer surface of the piston rod 3 is gradually increased from one end inserted into the sleeve 2 to the other end.

The scheme described above is to change the friction coefficient of the surface of the piston rod 3, and the position of the friction plate 4 is the same which is installed at the opening end of the sleeve 2 as the prior art. During the washing, the length of the piston rod 3 in the sleeve 2 is larger. One end of the piston rod 3 which has the larger friction coefficient of the surface is in contact with the friction plate 4 at the opening end of the sleeve 2, the pressure between the friction plate and the piston rod is larger and the damping force is larger. During the dewatering process, as the amount of water in the washing bucket decrease, the washing bucket assembly continually moves up, a length of the part of the piston rod 3 which is inside the sleeve 2 is getting shorter. The part of the piston rod with smaller surface friction coefficient is in contact with the friction plate 4, the pressure between the friction plate and the piston rod is smaller and the damping force is smaller. The scheme ensures that the damping force is variable regardless of the load and speed conditions, and the damping force changes more frequently especially during the low-speed dewatering process.

Embodiment 7

Figure 10:
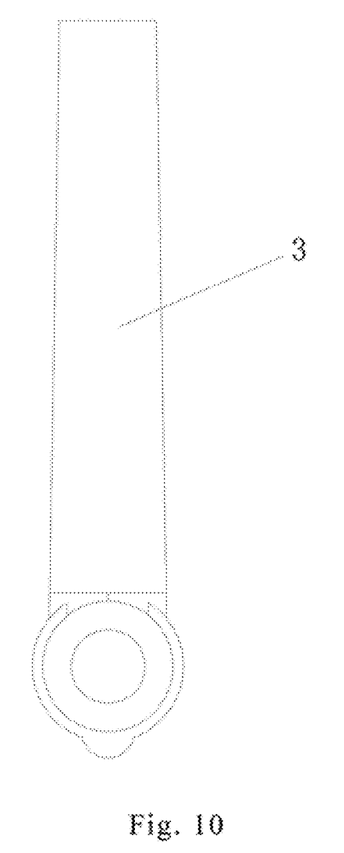
FIG. 10 is a schematic diagram of another structure of the piston rod of the shock absorber of the present disclosure.

As shown in FIG. 8 and 10, the different between the present embodiment and the embodiment 6 is: a diameter of the piston rod 3 is gradually increased from one end inserted into the sleeve 2 to the other end, and the piston rod is a truncated cone shaped structure (see FIG. 10).

The scheme mentioned above is to change the shape of the structure of the piston rod 3. During the washing process, the length of the part of the piston rod 3 inside the sleeve 2 is larger and the part of the piston rod 3 with larger diameter size is in contact with the friction plate 4 at the opening end of the sleeve 2, the pressure between the two is larger and the damping force is larger. During the dewatering process, the washing bucket assembly continually moves up as the water amount in the washing bucket decrease. The part of the piston rod 3 inside the sleeve decreases and the part of the piston rod 3 with smaller diameter is in contact with the friction plate 4, the pressure between the two is smaller and the damping force is smaller, it gets along with the frequently changing damping force during the low-speed dewatering process as well.

Embodiment 8

As shown in FIG. 9, the present embodiment is different from embodiment 6 or embodiment 7 mentioned above. Although only one set of friction plate 4 is adopted in the present embodiment, the shape of the structure of the friction plate 4 is changed. The principle is the same as that of the embodiment 7 in which the shape of the structure of the piston rod 3 is changed. Specifically, the piston rod 3 is a cylindrical structure, the friction plate 4 is a cylindrical structure affixed to the inner wall of the sleeve 2, and a thickness of the friction plate 4 is gradually reduced from the closed end to the opening end of the sleeve 2. During the washing, a length of the piston rod 3 in the sleeve 2 is larger, the piston rod 3 squeezed by the thicker part of the friction plate 4 and the damping force is larger. During the dewatering process, as the amount of water in the washing bucket decreased, the washing bucket assembly continually moves up, and the piston rod 3 slides outwardly which moves out of the squeezing of the thicker part of the friction plate 4 and gradually contacts with the thinner part of the friction plate 4, the pressure between the friction plate and the piston rod is smaller and the damping three is smaller.

The embodiments of the above description are merely illustrative of the preferred embodiments of the present disclosure and are not intended to limit the scope and scope of the disclosure. It will be understood by those skilled in the art that various changes and modifications in the technical solutions of the present disclosure are within the scope of the present disclosure without departing from the design idea of the present disclosure.

The invention claimed is:

1. A variable damping shock absorber, comprising a sleeve and a piston rod, one end of the sleeve being an opening and the other end being closed, one end of the piston rod being inserted into through the opening and being slideably provided in an axial direction inside the sleeve, wherein:
   at least a first friction plate and a second friction plate are arranged in the axial direction between an inner wall of the sleeve and an outer wall of the piston rod, the first friction plate and the second friction plate are fixed in the axial direction on the inner wall of the sleeve, and a sliding friction force between the first friction plate and the second friction plate and the outer wall of the piston rod is different;
   the first friction plate and the second friction plate are of a same material, and thicknesses of the first friction plate and the second friction plate in a radial direction of the sleeve are different,
   the thicknesses of the first friction plate and the second friction plate decrease from the closed end to the opening end of the sleeve.

2. The variable damping shock absorber according to claim 1, wherein the sliding friction force between the first friction plate or the second friction plate and the outer wall of the piston rod is gradually reduced from the closed end to the opening end of the sleeve.

3. The variable damping shock absorber according to claim 2, wherein the first friction plate and the second friction plate have a same thickness in a radial direction of the sleeve and have a different friction coefficient of a surface of one side which is configured to be in contact with the outer wall of the piston rod, and the friction coefficients decrease from the closed end to the open end of the sleeve.

4. The variable damping shock absorber according to claim 2, wherein the first friction plate and the second friction plate are of a same material, and thicknesses of the friction plates in a radial direction of the sleeve are different, and the thicknesses of each set of friction plates decrease from the closed end to the open end of the sleeve.

5. The variable damping shock absorber according to claim 1, wherein the first friction plate and the second friction plate are cylindrical structures, and a chamfered structure for facilitating an insertion of the piston rod is provided at each end of the first friction plate and the second friction plate corresponding to the opening end of the sleeve.

6. The variable damping shock absorber according to claim 5, wherein a head of the end, inserted into the sleeve, of the piston rod is provided with a truncated cone shaped guide structure which is easily passed through the friction plates.

7. The variable damping shock absorber according to claim 1, wherein a head of the end, inserted into the sleeve, of the piston rod is provided with a truncated cone shaped guide structure which is easily passed through the first friction plate and the second friction plate.

8. A variable damping shock absorber, comprising a sleeve and a piston rod, one end of the sleeve being an opening, the other end being closed, one end of the piston rod is inserted into through the opening and is slideably provided in an axial direction inside the sleeve, wherein:
   a first friction plate is arranged between an inner wall of the sleeve and an outer wall of the piston rod,
   the first friction plate is fixed in the axial direction on the inner wall of the sleeve, and is in contact with the outer wall of the piston rod and relatively slides to each other,
   when the piston rod is slid towards the opening, a friction force between the piston rod and the first friction plate along an axial direction of the piston rod is gradually reduced;
   wherein the piston rod is a cylindrical structure, the first friction plate is a cylindrical structure affixed to the inner wall of the sleeve, and a thickness of the first friction plate is gradually reduced from a closed end to an opening end of the sleeve.

9. The variable damping shock absorber according to claim 8, wherein a friction coefficient of an outer surface of the piston rod is gradually increased from the one end, inserted into the sleeve, to an other end.

10. A variable damping shock absorber, comprising a sleeve and a piston rod, one end of the sleeve being an opening, the other end being closed, one end of the piston rod is inserted into through the opening and is slideably provided in an axial direction inside the sleeve, wherein:
   a first friction plate is arranged between an inner wall of the sleeve and an outer wall of the piston rod,
   the first friction plate is fixed in the axial direction on the inner wall of the sleeve, and is in contact with the outer wall of the piston rod and relatively slides to each other,
   wherein when the piston rod is slid towards the opening, a friction force between the piston rod and the first friction plate along an axial direction of the piston rod is gradually reduced;
   a diameter of the piston rod is gradually increased from one end inserted into the sleeve to an other end, and the piston rod is a truncated cone shaped structure.

* * * * *